Oct. 22, 1957  J. R. McWHORTER  2,810,207
PROCESS FOR DRYING SILICA AQUAGEL
Filed June 8, 1954
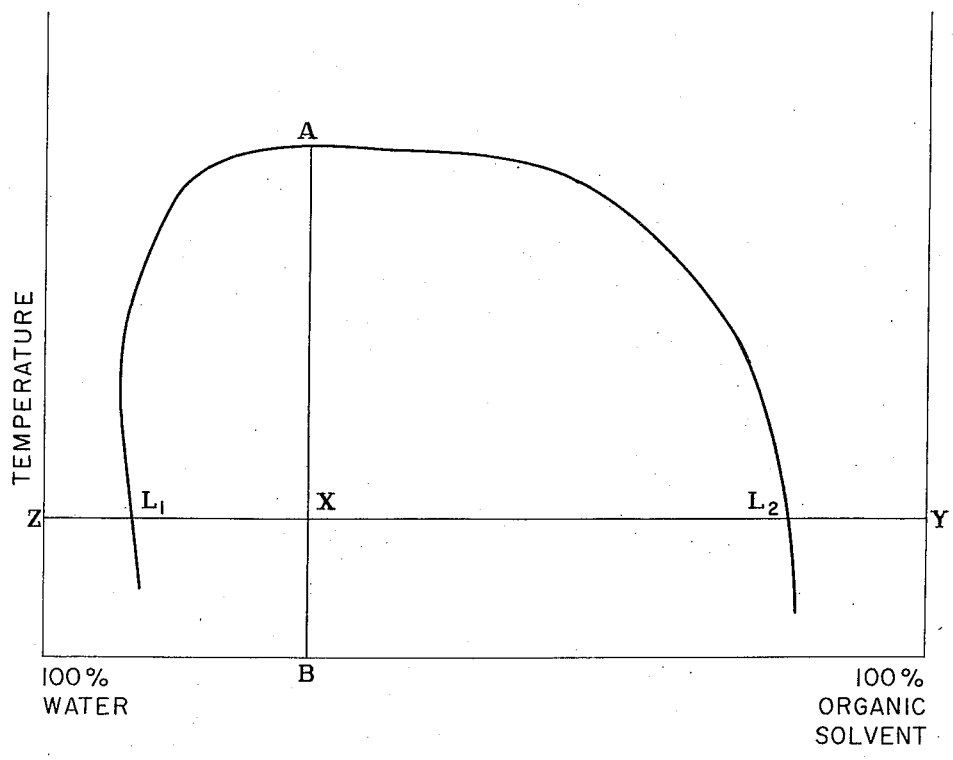
INVENTOR
JOHN R. MCWHORTER
BY  *Fred C. Carlson*
ATTORNEY

United States Patent Office 2,810,207
Patented Oct. 22, 1957

2,810,207
PROCESS FOR DRYING SILICA AQUAGEL

John R. McWhorter, Wilmington, Del., assignor to E. I. du Pont de Nemours and Company, Wilmington, Del., a corporation of Delaware Application June 8, 1954, Serial No. 435,349

6 Claims. (Cl. 34—9)

This invention relates to processes for vaporizing water from silica aquagels in admixture with organic liquids which in the temperature range of 0 to 60° C. form a separate phase with water but are sufficiently miscible with water that their phase diagrams with water have an upper consolute temperature between 60° C. and the critical point of the component having the lower critical point, said vaporization processes being effected without substantially shrinking the gel, and is more particularly directed to such processes in which a mixture of such an organic liquid with an aquagel containing water is heated to a temperature above its upper consolute temperature while maintaining the weight ratio of organic liquid to water in the mixture at a value no higher than that which gives a maximum decrease of 10% in the water phase:organic liquid phase volume fraction ratio during the heating, and water is vaporized from the mixture by continuing to heat the mixture above consolute temperature. The invention has especial application to systems in which the organic liquid is butanol-1 and the butanol:water ratio is maintained below 0.53 during the heating to the upper consolute temperature.

Silica aquagels as formed are porous, the pores being filled with water. When dried under ordinary conditions the gel structure is shrunk by the surface tensions set up as the volume of water present becomes insufficient to fill the pores. It has been proposed, in Kistler U. S. Patent 2,093,454 for instance, to avoid such shrinkage or collapse of the gel structure by heating the gel containing water in a confined space until the temperature is above the critical temperature. The gas is then released at a rate insufficient to damage the gel. The gel is left behind in a dried condition but having suffered little, if any shrinkage. Since water has an inconveniently high critical temperature and critical pressure, it may be replaced before the heating, as by washing it out with some liquid, such as an alcohol, that is very soluble or completely soluble in water. This liquid may then be replaced by other liquids miscible with it but insoluble in water.

The present invention is concerned with situations in which it is desired to vaporize water from silica aquagels without gel shrinkage, the aquagel being in admixture with an organic liquid which under ordinary conditions is only partially miscible with water in the gel and forms a separate liquid phase in its presence, but it is not desired to displace the water before the heating step as described in the preceding paragraph. An organic liquid such as butanol-1 is not completely miscible with water at ordinary temperatures (25° C.) and hence its use to displace water from a silica aquagel directly, according to the method of the Kistler Patent 2,093,454, is not practicable; neither is it practicable to wash the gel first with a liquid which is miscible with both water and butanol and then replace the intermediate liquid with butanol, since this would entail the expense of costly solvent-recovery processes as well as the expense of the intermediate washing.

On the other hand, I have found that unless special control is exercised during the heating of silica gels in two-phase systems such as butanol-water, the gel structure shrinks during the heating even though evaporation of liquid is avoided by effecting the heating in a confined spaced. Thus, it would be futile to heat such a system to the critical temperature before permitting evaporation in an attempt to avoid structure collapse, because the collapse would have occurred during the heat-up.

The present invention has reference to the control which I have found must be exercised over such a two-phase system during heating to avoid gel shrinkage. I have found that, in silica aquagel-water-organic liquid systems of the type described in the first paragraph of col. 1, if water vaporization is to be effected without substantially shrinking the gel, the organic liquid-water weight ratio of the mixture must be maintained below a certain critical value while heating the mixture to a temperature above its upper consolute temperature, no higher than that which gives a maximum decrease of 10% in the water-phase:organic liquid phase volume fraction ratio, and that thereafter vaporization of water from the mixture by continued heating above the consolute temperature can be effected without gel shrinkage.

A theoretical explanation of this invention which appears to fit the observed facts is the following. When a two component system such as butanol and water is heated in a closed system the two phases become more soluble in each other until, at the upper consolute temperature, the phases are completely miscible. The pores of the gel as formed are originally filled with water, and if the proportion of organic liquid originally present in the two-phase system is too high, the organic liquid-water interface migrates into the gel pores during the heating to the consolute temperature, causing compression of the gel by forces of interfacial tension. Whether this theory is a true explanation or not, the observed facts are as herein stated.

The processes of this invention are broadly applicable to aquagels as a class. The art is familiar with a variety of ways of making aquagels, several preferred methods of making silica gels being those described in Iler U. S. Patent 2,657,149 at columns 7 through 10. Broadly, silica aquagels have a porous internal structure which results in the dried product having a surface area in the range from 60 to 1000 square meters per gram (m.$^2$/g.) as determined from its nitrogen adsorption. The advantages of employing a process of this invention are especially noticeable with silica aquagels with surface areas in the range of 200 to 900 m.$^2$/g.

The processes of the invention are also especially applicable when the gel structure is one of aggregates consisting of dense, substantially uniform-sized, amorphous silica spheroids joined together into open-packed, reticulated structures. These structures may be lightly or heavily reinforced or coalesced at the junction points of the spheroids, depending upon the properties desired in the ultimate product.

Gels characterized by a very open packing lead to products which are particularly valuable. The openness of packing can be measured by the linseed oil absorption; the more open the packing, the greater the oil absorption. A suitable test is described in A. S. T. M. Standards for 1949, 4, p. 169. The gels to which this invention has preferred applicability have a linseed oil absorption, expressed as milliliters of oil per 100 grams of anhydrous gel, of from 1 to 3 times the specific surface area in square meters per gram.

The silica gel may be formed in the presence of the organic liquid in which it is later to be heated. In a particularly preferred process of the invention, butanol-1 is mixed with an equal weight of aqueous colloidal silica sol having a pH of 2 to 4, a silica concentration of about 15% by weight, and a silica particle size giving a surface area of from 400 to 460 square meters per gram, and being substantially free of anions other than hydroxyl and cations other than hydrogen, the pH of the mixture is raised to about 5.5 by adding alkali and the mixture is heated to about 85° C. to gel the sol, the mixture is further alkalized to a pH of about 7 and the gel is heated at 85° C. until a reduction of 10 to 25% in the specific surface area of the gel is effected. From this mixture butanol-rich phase is removed, according to the invention, until the butanol-water weight ratio is below about 0.53, the mixture is heated under superatmospheric pressure above its consolate temperature, and water is vaporized above said temperature to dehydrate the gel.

The processes of this invention have especial applicability to open-pored silica gels—that is, gels which have an average pore diameter of at least 4 millimicrons.

The organic liquid used in a process of this invention can be any organic liquid which at 0 to 60° C. forms a separate phase with water but is sufficiently miscible with water that its phase diagram therewith has an upper consolute temperature between 60° C. and the critical point of the component having the lower critical point. The critical point of each liquid, of course, is the maximum temperature at which its vapor can be liquefied—that is, the temperature above which the liquid cannot exist, no matter how great the pressure applied to it. For pure water the critical temperature is 647° absolute (373.8° C.). Therefore, if the organic liquid has a critical temperature above 373.8° C., the upper consolute temperature of the mixture must lie between 60° C. and the critical temperature which is the lower value—namely, 373.8° C., whereas, if the critical temperature of the organic liquid is below 373.8° C., the consolute temperature must lie between 60° C. and the critical temperature of the organic liquid. Two-phase mixtures of pure butanol-1 and pure water have an upper consolute temperature of ca. 125° C., which is between 60° C. and the critical point of butanol-1 (287° C.), and hence butanol-1 is an organic liquid to which the present invention applies. The term "upper consolute temperature," of course, refers to the temperature at which the two liquid phases become identical in composition and exist as a single phase—in other words, the upper temperature at which the two liquids are miscible in all proportions.

It will be understood that the organic liquid must form a separate phase at some temperature in the range of 0 to 60° C. but not necessarily at all temperatures in this range. Also, the separate phases must form at least with some proportions, but not necessarily with all proportions of the organic liquid and water. For instance, butanol-1 is sufficiently soluble in water that if 99.9 parts of water were mixed with 0.1 part butanol-1, the butanol would dissolve completely and no second phase would form in the specified temperature range. The invention has application to mixtures where the proportions are such that two phases are formed.

The organic liquid must be sufficiently miscible with water that its phase diagram with water has an upper consolute temperature as above-described. Phase diagrams and their use to delineate upper consolute temperatures are well understood in the art, being described, for instance, in "Textbook of Physical Chemistry," by Glasstone, second ed., 1946, at pages 721 to 732. It will be noted that the presence of impurities, such as salts or other organic liquids, can materially change the shape of the phase diagram as well as the mutual solubilities of the components. The processes of the invention have application to organic liquids which with water give the physical properties specified, whether or not these properties are influenced by impurities.

Processes of the present invention have especial applicability when the organic liquid answering the foregoing requirements is an alcohol. Alcohols have chemical stability, low interfacial tensions with water in two-phase systems, and low chemical reactivity with acidic or basic aqueous solutions. Used with particular advantage are the monohydric alcohols having from 4 to 8 carbon atoms and in which the —OH group is on a primary or secondary carbon—that is, in which the carbon attached to oxygen is also attached to hydrogen. Butanol-1 is a specific example of this class, as are amyl and hexyl alcohols.

The adjustment of the organic liquid-to-water ratio in a process of the invention can be accomplished in any convenient manner. It can be accomplished, for example, by adding the required quantity of organic liquid or of water, or by decanting or siphoning off the excess organic liquid or water phase. Alternatively, the more volatile liquid layer, if in excesss, can be distilled off under atmospheric or reduced pressure. It is usually preferred to avoid heating the system until after the ratio has been adjusted. As already mentioned the adjustment can be accomplished by forming the gel in a pre-selected, suitably proportioned water-organic liquid mixture.

The lower limit within which the organic liquid-water ratio is adjusted is fixed by the requirements for starting with a two-phase system as already discussed. The lower limit is fixed by the miscibility of the two components. This will, of course, vary with the temperature of mixing and the organic liquid selected. It is also affected by the presence of other possible constituents of the system such as salts or other organic liquids. One skilled in the art can determine this limit, however, by reference to the phase diagram of a system analogous in all respects to the experimental system except containing no silica gel. The necessary diagrams or the information from which to construct them are frequently available in the literature in such reference sources as, for example, "Solubilities of Organic Compounds" by A Seidell, 3rd ed., 1941. If data is not available, the phase diagram can easily be determined using data obtained by standard methods such as are discussed on pages 724 to 726 of the Glasstone text already mentioned.

The upper limit within which the organic liquid-water ratio is adjusted is a ratio no higher than that which gives no decrease greater than 10% in the water phase: organic liquid phase volume fraction ration during the heating to above the consolate temperature. Since there is some organic liquid dissolved in the water phase, and vice versa, it is perhaps more accurate to call the water phase the "water-rich" phase and the organic phase the "organic-rich" phase, and it will be understood that this is meant in the present discussion. Stated at greater length, the volume fraction of the water-rich phase relative to the volume fraction of the organic liquid-rich phase should not, with a suitable ratio, decrease by a factor greater than 10% during the heating from the initial temperature (say ca. 25° C.) to the upper consolute temperature.

This upper limit on organic liquid-water ratio can also be determined by reference to the phase diagram of the mixture. A typical phase diagram of a two liquid phase system is shown in Fig. 166, p. 724, of the above-mentioned Glasstone text. A similarly shaped diagram can be drawn for the water-organic liquid mixtures here employed, as shown in the drawing. In this diagram the ordinates represent temperature and the abscissae show the composition of the mixture by weight, ranging from 100% water on the left-hand intercept to 100% organic liquid on the right-hand intercept. A line, ZY, representing a prescribed temperature is drawn parallel to the horizontal axis, from Z on the 100% water composition line to Y on the 100% organic liquid line, intersects the composition curve successively at $L_1$ and $L_2$. A vertical line is drawn from a point, B, on the horizontal axis to a point A which is the maximum temperature on the composition curve. This line intersects line $ZL_1L_2Y$ at $X$, a point between $L_1$ and $L_2$.

The line $AXB$ defines a constant composition and the line $ZXY$ defines a constant temperature. At the prescribed temperature, points $L_1$ and $L_2$ describe the composition of the two phases present in equilibrium at that temperature. The distance $XL_1$ shows the relative amount of the phase having the composition given by $L_2$, while the distance $XL_2$ gives the relative amount of the phase having the composition $L_1$. The ratio $$\frac{XL_2}{XL_1}$$

is the weight fraction of the water-rich phase relative to that of the solvent-rich phase. If $d_1$ is the density of the water-rich phase and $d_2$ the density of the solvent-rich phase, then the ratio $$\frac{XL_2}{d_1} : \frac{XL_1}{d_2} \text{ or } \frac{XL_2 \, (d_2)}{XL_1 \, (d_1)}$$

will give the value of the volume fraction of the water-rich phase relative to the volume fraction of the organic liquid-rich phase at that temperature and composition.

The upper limit of organic liquid-to-water ratio in processes of the present invention is, then, the composition of the system, represented by a line such as $AXB$, which can be heated from an initial temperature such as represented by line $ZXY$ to the upper consolute temperature "$A$," without a decrease of more than 10% in the value of the fraction $$\frac{XL_2 \, (d_2)}{XL_1 \, (d_1)}$$

during the heating. Ideally, of course, the value of the fraction shows no decrease.

The precise numerical value of this ratio limit depends upon the nature of the organic liquid, the temperature of mixing the components, and the presence of constituents other than silica gel, such as salts or other organic liquids. With butanol-1 and normal amounts of impurities the maximum organic liquid-water weight ratio is 0.53.

Once the ratio has been properly adjusted as just described, neither the rate of heating the mixture to the consolute temperature, nor the method employed, is critical, and any convenient method can be chosen. The heating can be effected in a closed system if necessary. The lower limit from which the temperature is raised is the temperature of mixing the components; this must be such that a two-phase system is formed by the mixing.

After the mixture has been heated to the consolute temperature, water is vaporized by continued heating at or above the consolute temperature. Such water removal can be, and usually is, accompanied by vaporization of organic liquid also. For example, if the organic liquid is butanol-1, water may be vaporized together with butanol-1 as an azeotrope, and this water-removal can be carried to such an extent that esterification of silanol groups on the surface of the silica is effected, in accordance with the disclosure of Iler U. S. Patent 2,657,149. The water removal can be effected by further heating the mixture, under pressure, until the critical temperature is exceeded and then venting the vapors, as taught by Kistler in U. S. Patent 2,093,454. The gel can be "exploded" by sudden release of the pressure, as taught by Archibald et al., in U. S. Patent 2,438,379. The practices taught by Pierce et al., in U. S. Patent 2,454,941 can also be followed.

It has been found that the effectiveness of the esterified product, prepared as just described, for thickening oils to make greases is a measure of the extent to which gel shrinkage and structure collapse have been avoided. In making such comparisons it is found that a surface-esterified gel of the best structure hitherto available id improved substantially, in respect to oil thickening efficiency, if the heating is carried on according to a process of this invention.

The invention will be better understood by reference to the following illustrative example in addition to those already given.

*Example*

A silcia gel-butanol-1 slurry containing 6.7 parts of 15% $SiO_2$ aquagel and 6.6 parts of water-saturated butanol-1 was prepared. The butanol:water weight ratio was adjusted to 0.51 by decanting off 2.0 parts of water-saturated butanol. The slurry was then pumped through a steam-jacketed heater into a distillation column where the water content of the system was removed azeotropically. The temperature of the gel feed entering the preheater was 25 to 40° C. and the temperature at the preheater exit was 130 to 160° C.—that is, above the consolute temperature of the water—butanol-1 mixture. The preheater was, of course, operated under super-atmospheric pressure.

The dehydrated slurry was then esterified as taught in Iler U. S. Patent 2,657,149 by treatment with butanol-1 in an autoclave.

The esterified product was used in an oil to form a grease. When the esterified silica-oil mixture was milled 7 passes on an ink mill the esterified silica was found to have a thickening index of 14.1. In contrast, a similar product prepared in identical manner except having a butanol-water weight ratio of 0.7 as fed to the preheater, had a thickening index of 15.8. It will be seen that an improvement of about 10% in the thickneing efficiency of the product resulted from the ratio adjustment in accordance with a process of this invention.

(Thickening index is roughly the concentration of thickener required to produce a grease of standard consistency [275 A. S. T. M. penetration]. It is normally determined by milling a 13.3% mixture of silica in a standard oil for 7 passes on a 3-roll ink mill with .0015" roll clearance, and by graphically converting the consistency obtained to thickening index values. Obviously, the lower the thickening index, the more efficient is the filler.)

I claim:

1. In a process for vaporizing water from a silica aquagel-butanol-1 mixture without substantially shrinking the gel, the mixture containing water and butanol-1 in such a proportion that both a water-rich phase and a butanol-rich phase are formed at the initial temperature, the steps comprising heating the aquagel-butanol mixture under super-atmospheric pressure to a temperature above its upper consolute temperature while maintaining the total butanol to total water weight ratio in the mixture below 0.53:1, and vaporizing water from the mixture by continuing to heat it under pressure above said consolute temperature.

2. In a process for dehydrating a silica aquagel having butanol-1 mixed therewith, said dehydration being effected without substantially shrinking the gel, the mixture containing water and butanol-1 in such a proportion that both a water-rich phase and a butanol-rich phase are formed at the initial temperature, the steps comprising adjusting the total butanol to total water weight ratio in the mixture to below 0.53:1, heating the aquagel-butanol mixture under super-atmospheric pressure to a temperature above its upper consolute temperature, and vaporizing water therefrom by continued heating under pressure above said consolute temperature.

3. In a process for producing a dehydrated silica gel the steps comprising mixing a colloidal silica aquasol with butanol-1, the mixture containing water and butanol-1 in such a proportion that both a water-rich phase and a butanol-rich phase are formed at the initial temperature, gelling the silica present to form an aquagel by raising the pH of the system, adjusting the total butanol to total water weight ratio in the mixture to below 0.53:1, heating the aquagel-butanol mixture under super-atmospheric pressure to a temperature above its upper consolute temperature, and vaporizing water therefrom by continued heating under pressure above said consolute temperature until the water has been removed.

4. In a process for vaporizing water from a silica aquagel-butanol-1 mixture without substantially shrinking the gel, the mixture containing water and butanol 1 in such a proportion that both a water-rich phase and a butanol-rich phase are formed at the initial temperature, the steps comprising adjusting the proportion of butanol to water to a value such that the ratio of the water-rich phase volume fraction to the butanol-rich phase volume fraction does not decrease by more than 10% upon heating the mixture from the initial temperature to the upper consolute temperature of the mixture, then heating the mixture in a closed system to a temperature above said upper consolute temperature, and finally vaporizing the water under pressure at a temperature higher than said upper consolute temperature.

5. In a process for vaporizing water from a silica aquagel-butanol-1 mixture without substantially shrinking the gel, the mixture containing water and butanol 1 in such a proportion that both a water-rich phase and a butanol-rich phase are formed at the initial temperature, the steps comprising adjusting the proportion of butanol to water to a value such that the ratio of the water-rich phase volume fraction to the butanol-rich phase volume friction does not decrease upon heating the mixture from the initial temperature to the upper consolute temperature of the mixture, then heating the mixture in a closed system to a temperature above said upper consolute temperature, and finally vaporizing the water under pressure at a temperature higher than said upper consolute temperature.

6. In a process for producing a dehydrated silica gel, the steps comprising mixing butanol-1 with about an equal weight of aqueous colloidal silica sol having a pH of from 2 to 4, a silica concentration of about 15% by weight, and a silica particle size giving surface area of from 400 to 460 square meters per gram, and being substantially free of anions other than hydroxyl and cations other than hydrogen, raising the pH of the mixture to about 5.5 and heating to about 85° C. to gel the sol, further alkalizing to a pH of about 7 and heating the gel at about 85° C. until a reduction of 10 to 25% in the specific surface area of the gel is effected, removing butanol-rich phase until the butanol-water weight ratio is below about 0.53, heating the mixture under super-atmospheric pressure above its consolute temperature, and vaporizing water above said temperature to dehydrate the gel.

References Cited in the file of this patent
UNITED STATES PATENTS

| | | |
|---|---|---|
| 2,249,767 | Kistler | July 22, 1941 |
| 2,386,337 | Moyer | Oct. 9, 1945 |
| 2,454,941 | Pierce et al. | Nov. 30, 1948 |
| 2,455,445 | See et al. | Dec. 7, 1948 |
| 2,503,913 | Kimberlin et al. | Apr. 11, 1950 |
| 2,528,767 | Marisic | Nov. 7, 1950 |